United States Patent [19]

Hove

[11] Patent Number: 4,844,802
[45] Date of Patent: Jul. 4, 1989

[54] APPARATUS FOR CONTACTING A GAS WITH A LIQUID, IN PARTICULAR FOR AERATING WASTE WATER

[75] Inventor: Dirk Ten Hove, Hooglanderveen, Netherlands

[73] Assignee: DHV Raadgenvend Ingenieursbureau B.V., Amersfoort, Netherlands

[21] Appl. No.: 150,849

[22] Filed: Feb. 1, 1988

Related U.S. Application Data

[62] Division of Ser. No. 906,458, Sep. 12, 1986, Pat. No. 4,741,869.

[51] Int. Cl.⁴ .................................................. B01F 3/04
[52] U.S. Cl. ..................................... 210/219; 210/926; 261/91
[58] Field of Search ................... 210/926, 219; 261/91

[56] References Cited

U.S. PATENT DOCUMENTS

| 3,510,110 | 5/1970 | Klein | 210/926 |
| 3,887,660 | 6/1975 | Romantschuk et al. | 261/91 |
| 4,269,709 | 5/1981 | Rongved | 210/926 |
| 4,537,679 | 8/1985 | Reid | 261/DIG. 75 |

FOREIGN PATENT DOCUMENTS

| 2706078 | 8/1978 | France | 210/926 |
| 61-159 | 1/1986 | Japan | 210/926 |

Primary Examiner—Tim Miles
Attorney, Agent, or Firm—Wolf, Greenfield & Sacks

[57] ABSTRACT

An apparatus for aerating waste water comprising a surface aerator adapted to rotate about a vertical axis. A cap is disposed over the aerator and is modified to improve the operation of the apparatus. The waste water flows in a closed circuit and a partition is provided separating the parts of the circuit lying upstream and downstream of an aeration zone. The surface aerator is arranged in an aeration zone in the neighborhood of an end of the partition.

8 Claims, 9 Drawing Sheets

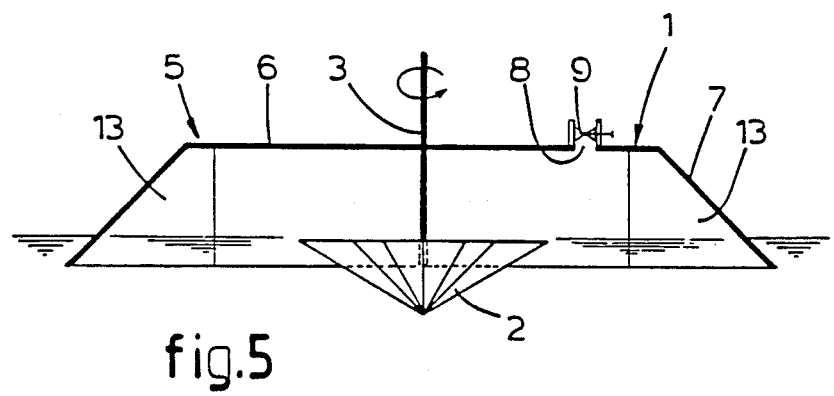
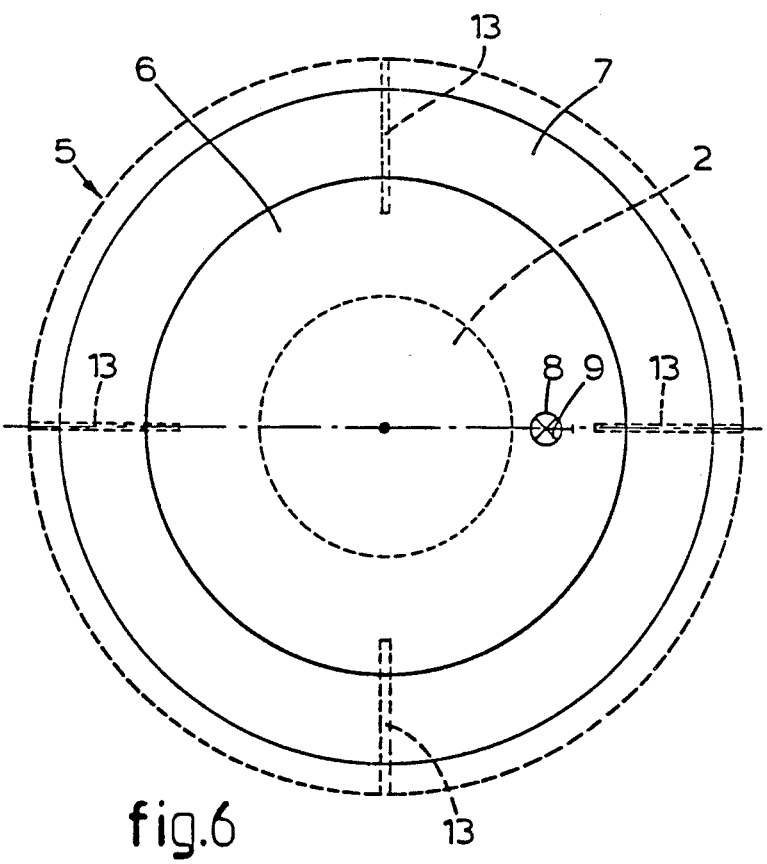

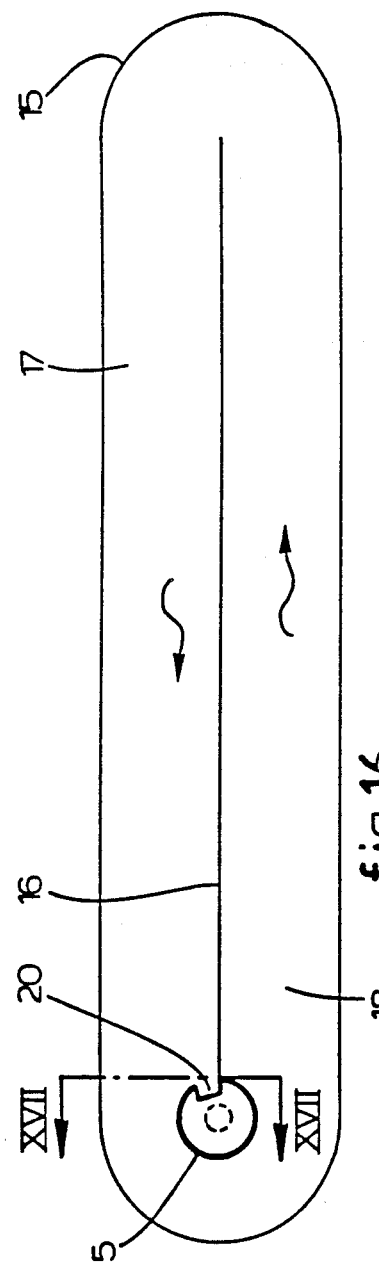
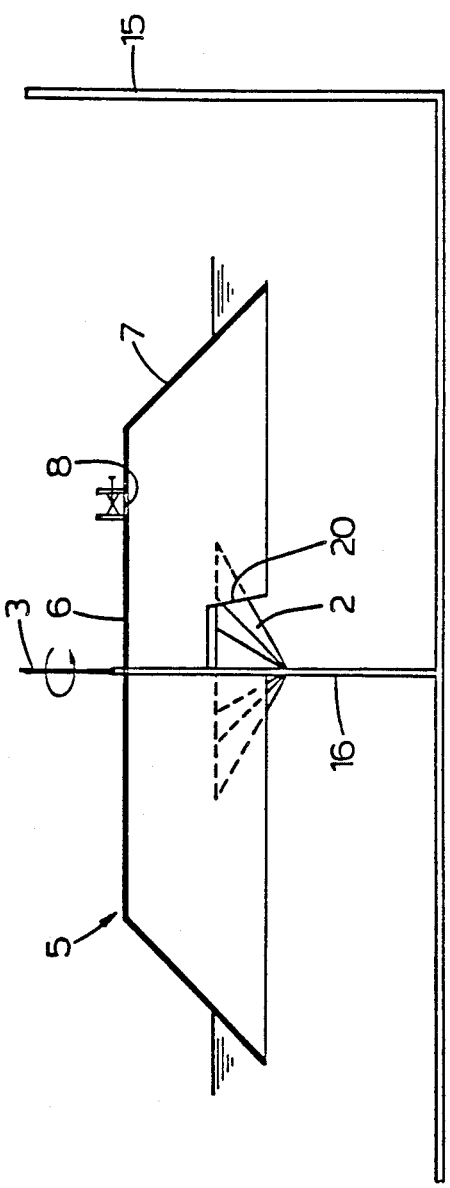
fig.16
fig.17

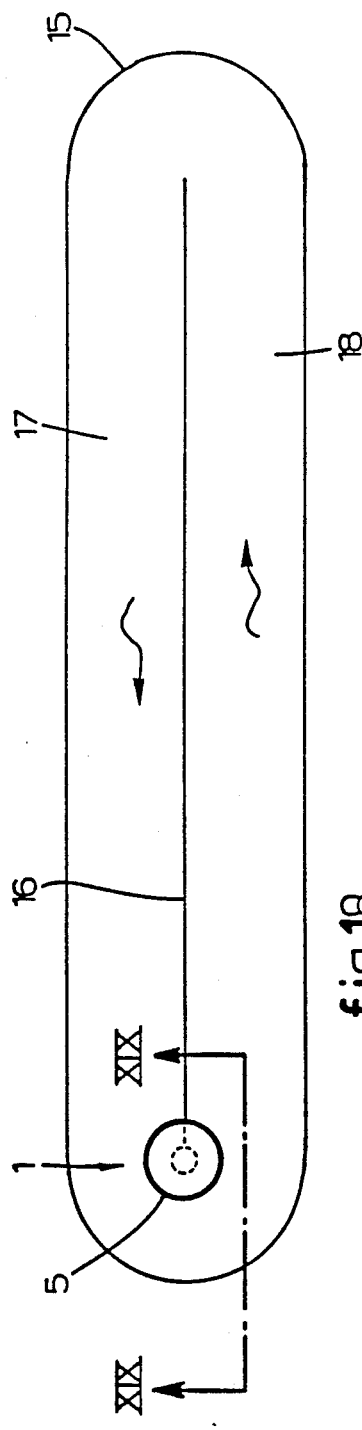
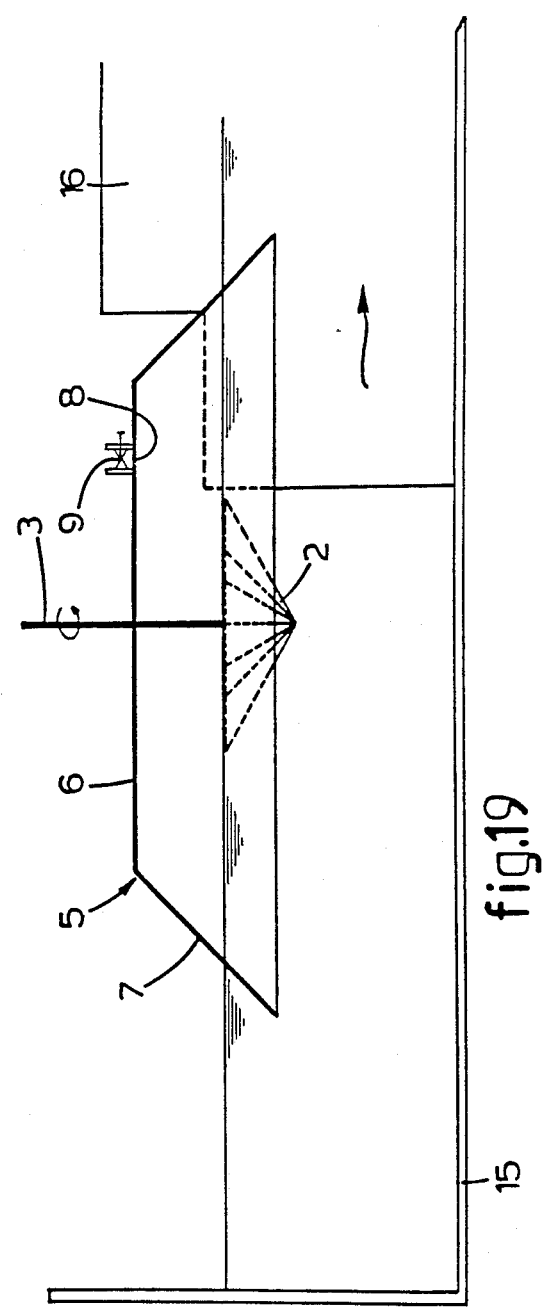
fig.18
fig.19

APPARATUS FOR CONTACTING A GAS WITH A LIQUID, IN PARTICULAR FOR AERATING WASTE WATER

This application is a division of application Ser. No. 06/906,458, filed Sept. 12, 1986, now U.S. Pat. No. 4,741,869.

BACKGROUND OF THE INVENTION

The invention relates to an apparatus for contacting a gas with a liquid, in particular for aerating waste water. More particularly, the invention relates to aerating waste water in an installation for treating waste water.

Such apparatuses are being used successfully for a long time in installations for treating waste water. In further developments of these apparatuses it was proposed according to the British patent specification No. 1,547,115 of applicant to dispose a rigid cap over the surface aerator, the cap having a downwardly directed circumferential side wall which terminates, during operating, below the liquid surface, and having a gas inlet opening with an adjustable crosssection. By the use of said cap, the nuisance due to the splashing of the surface aerator, and to the noise generated by the same was effectively reduced and in addition, if a stench was produced, this was arrested to a very considerable extent by the cap.

Although the cap, of course, impedes the gas supply to the surface aerator, it had been surprisingly found that the cap causes a very significant improvement of the oxygen introduction efficiency. This improvement appeared to be due to a different operation of the surface aerator in the closed space at a reduced gas supply. By the presence of the cap the outflow of the gas bubbles produced by the aerator is slowed down. Furthermore, throwing out liquid by the surface aerator against the inner side of the cap causes a high rate of turbulence, which improves the transfer of oxygen of the gas bubbles to the liquid. This optimal condition can be recognized in the appearance of foam along the inner side of the side wall of the cap as a consequence of the accumulation of gas bubbles.

SUMMARY OF THE INVENTION

It is a main object of the present invention to further improve the cap of this known apparatus.

One of the secondary objects is to provide a new aearator cap, with which the oxygen introduction efficiency is further increased.

Another object of the invention is to provide an aerator cap, with which a high oxygen introduction efficiency can be obtained for a wide range of aerator speeds.

A further object of the invention is to provide an aerator cap, which can optimally be used in situations, in which the aerator serves not only for contacting a gas with a liquid but also for effecting a circulation flow in a liquid reservoir.

Still a further object of the invention is to provide an aerator cap, which enables soil floating on the liquid to be desintegrated in a sufficient way.

According to a first embodiment of the apparatus according to the invention the cap is provided not only with a gas inlet opening but also with a gas outlet opening in one of the walls of the cap, an exhauster mounted in the cap serving as means for exhausting gas from under the cap.

In this way it is possible to increase the efficiency of the apparatus. The explanation for this is as follows. Tests have proved that in the known cap a certain degree of oxygen depletion occurs in the oxygen containing gas, mostly air, which is inside the cap. This is related to the fact that a substantial part of the gas bubbles which are smashed into the liquid by the aerator return again under the cap (necessary for improving the efficiency). These gas bubbles have delivered a part of their oxygen to the liquid, whereby the oxygen concentration in these gas bubbles has decreased. Consequently the oxygen concentration inside the cap decreases. As a result of the underpressure prevailing inside the cap fresh gas is indeed continuously sucked in through the gas inlet opening, but this is insufficient to compensate the oxygen depletion mentioned. Since according to the invention gas is sucked out from under the cap, which gas is poor in oxygen, additional gas can be sucked in through the gas inlet opening as a result of the growing underpressure, which inflowing gas is more rich in oxygen than the gas under the cap. Consequently the oxygen concentration of the gas under the cap increases, whereby the oxygen introduction efficiency of the aerator increases.

The apparatus according to the invention is specifically adapted for use in an installation for treating waste water, wherein the waste water flows in a closed circuit and a partition separates the parts of the circuit upstream and downstream of an aeration zone. In this installation the aerator of the apparatus is positioned in the neighbourhood of a free end of the partition and serves also for generating a circulation flow in the liquid circuit. In practice such an installation is known as the 'Carrousel', which is used successfully for many years. In order to fit the apparatus for aerating waste water according to the invention specifically for use in the installation mentioned it is first of all proposed, that a part of the side wall of the cap, which is adjacent to the side of the partition facing the downstreeam part of the circuit terminates shorter in downward direction than the remaining portion of this side wall. In this way the horizontal propulsion flow generated by the aerator can pass the cap unhindered without being deflected downwardly by the cap. Hereby a sufficient circulation flow can be maintained without additional propulsion means. It is also possible to place the portion of the side wall of the cap, which is adjacent to the side of the partition facing the downstream portion of the circuit at a smaller inclination to the horizontal than the remaining portion of this side wall. Hereby a vertical deflection of the propulsion flow is also reduced.

A further improvement of the apparatus according to the invention, which can be used in the above mentioned installation, is that the portion of the side wall of the cap which is adjacent to the side of the partition facing the upstream part of the circuit has a recess at the height of the liquid surface. Preferably the recess extends from the lower edge of the side wall of the cap and terminates above the liquid surface. In this way it is possible that soil floating on the liquid is caught into the cap and is intensively contacted with the oxygen therein, so that this soil is sufficiently desintegrated. Additionally the liquid circuit can be provided with means, which guide the soil floating on the liquid to the recess in the aerator cap.

According to the invention the partition of the liquid circuit generally extending up to the circumference of the aerator may extend upwardly to such an extent, that the partition in the portion below the cap only projects a distance of at most 0.1 times the diameter of the aerator above the liquid surface. In this way on one hand a proper propulsion of the liquid is assured, while on the other hand foam along the inner side of the cap mentioned hereinbefore is not interrupted by the partition in an undesirable manner.

BRIEF DESCRIPTION OF THE DRAWINGS

The invention will hereafter be elucidated with reference to the drawings, which very schematically show a number of embodiments of the apparatus for contacting a gas with a liquid by way of example.

FIG. 5 shows an alternative of the apparatus of FIG. 3 in transverse section.

FIG. 6 is a plan view of the apparatus of FIG. 5.

FIG. 16 is a plan view of an installation corresponding to FIG. 12, in which an apparatus according to the invention with still another aerator cap is used.

FIG. 17 is a section along the line XVII—XVII in FIG. 16, on an enlarged scale.

FIG. 18 is a plan view of an installation corresponding to FIG. 12, in which the partition is adapted to the aerator cap.

FIG. 19 is a section along the line XIX—XIX in FIG. 18, on an enlarged scale.

DETAILED DESCRIPTION OF PREFERRED EMBODIMENTS

Figure 1:
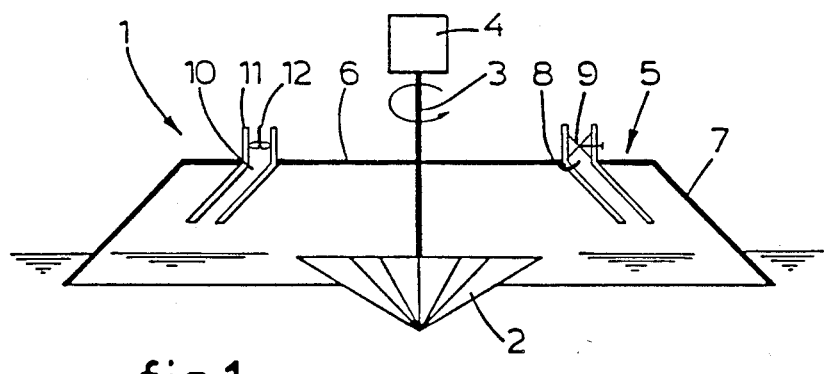
FIG. 1 is a transverse section of a first embodiment of the apparatus according to the invention.

The drawings show a number of embodiments of an apparatus 1 for contacting a gas with a liquid, and in particular for aerating waste water. In the several figures corresponding parts have been indicated with the same reference numerals.

In all these embodiments the apparatus 1 is equipped with a surface aerator 2, lying at the level of the water surface during its operation; in the embodiment as shown this aerator has a conical aerating body. Of course, other kinds of surface aerators may be used instead. The surface aerator 2 is carried by a vertical shaft 3, which is coupled with a driving means 4, by which it is brought into rotation during operation. A cap 5 disposed over the surface aerator 2 consists of a substantially horizontal top wall 6 having a circular circumference, and an adjoining downwardly directed circumferential side wall 7 terminating below the liquid surface during operation. Generally the side wall 7 is inclined at 45° to the horizontal. In the top wall 6 of the cap 5 in air inlet opening 8 is formed, whose cross-section is adjustable by means of a valve 9. Of course, the cap 5 may also be provided with a plurality of air inlet openings, each having its own valve.

Figure 2:
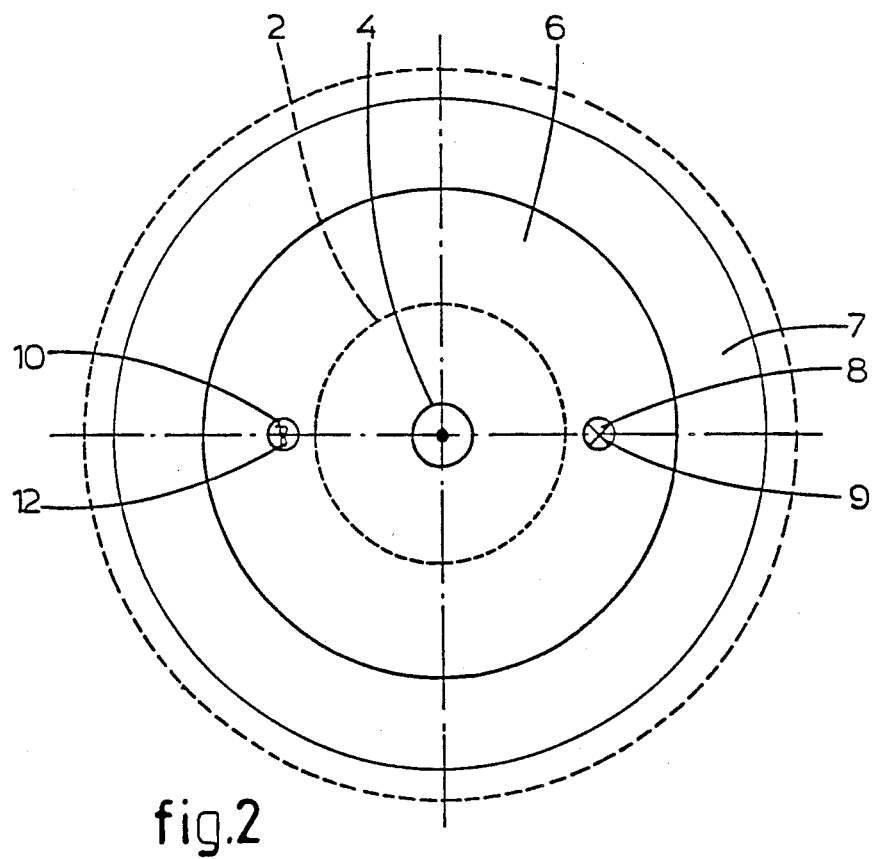
FIG. 2 is a plan view of the apparatus of FIG. 1.

In a first embodiment according to FIG. 1 and 2 an air outlet opening 10 is provided in the top wall 6 of the cap 5. An outflow pipe 11 extends through this air outlet opening 10, a driveable exhauster 12 being arranged in said outflow pipe 11, which serves for exhausting air from under the cap 5.

Figure 3:
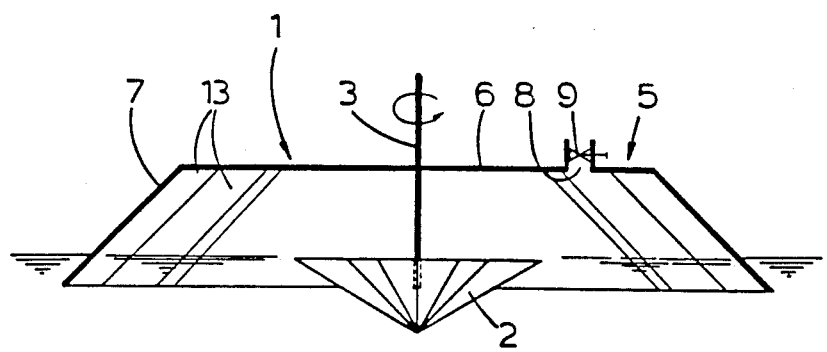
FIG. 3 is a transverse section of a second embodiment of the apparatus according to the invention.
Figure 4:
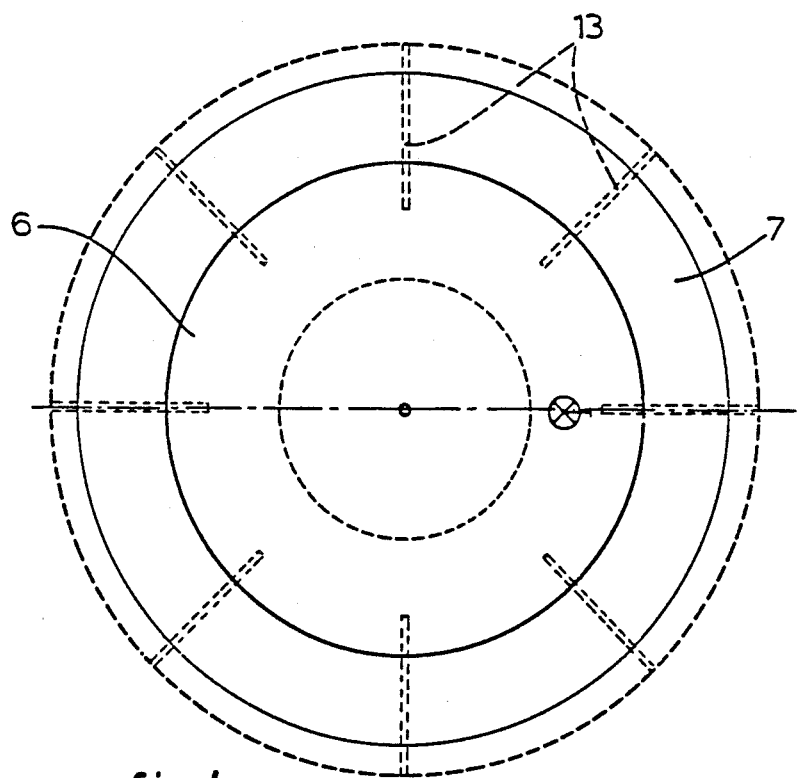
FIG. 4 is a plan view of the apparatus of FIG. 3.

The FIG. 3 and 4 show an embodiment of the apparatus according to the invention, wherein a number of circumferentially spaced baffles 13 are provided at the inner side of the cap 5. These baffles 13 extend upwardly from the lower side of the cap 5 to the top wall 6, and these baffles 13 extend over a distance radially inwardly. The radial dimension of the baffles 13 is constant along the whole length. It is also possible that the baffles terminate in upward direction at a distance below the top wall 6.

As an alternative FIG. 5 and 6 show an embodiment, wherein the baffles 13 terminate short before the circumference of the aerator 2 at the height thereof, and the inner sides of the baffles 13 extend vertically upwardly, so that the radial dimension of the baffles 13 decreases in the upward direction.

FIG. 7-10 show a further series of embodiment of the apparatus 1 for aerating waste water, wherein the side wall 7 of the cap 5 comprises a lower edge 14. This edge 14 is lying below the liquid surface during operation.

Figure 7:
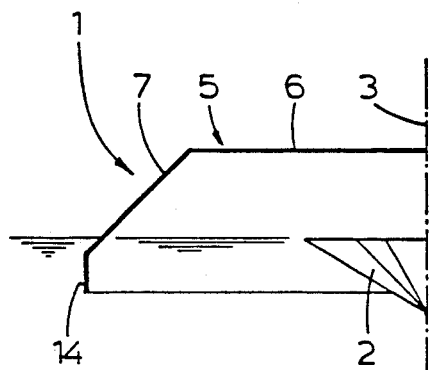
FIG. 7-10 show half of transverse sections of further alternative embodiments of the apparatus according to the invention.
Figure 8:
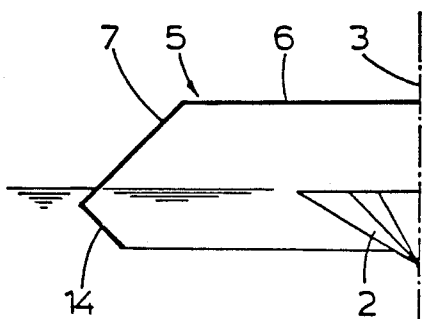
Figure 9:
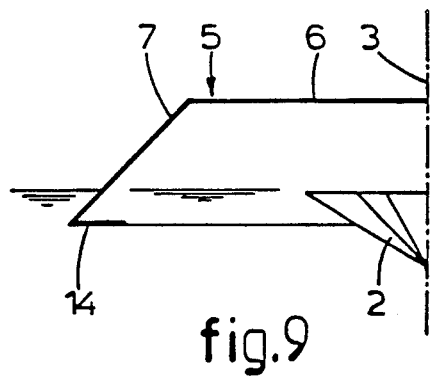
Figure 10:
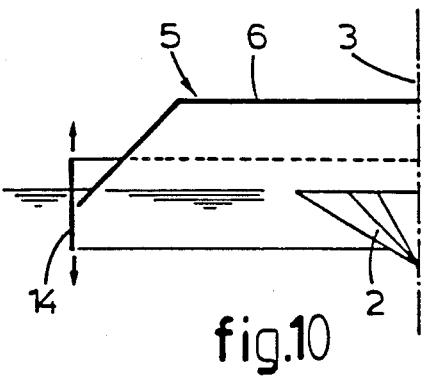

As can be seen in FIG. 7 the lower edge 14 may extend vertically downwardly from the remaining portion of the side wall 7 of the cap 5, so that the lower edge 14 has a cylindrical configuration. FIG. 8 illustrates an embodiment, wherein the lower edge 14 tapers conically from the remaining portion of the side wall 7, and according to FIG. 9 the lower edge 14 extends inwardly in a plane which is substantially perpendicular to the axis of rotation 3 of the aerator 2. The length of the lower edge 14 transverse to the circumference thereof amounts to about 0.05 to 0.4 times the diameter of the aerator 2. FIG. 10 shows another embodiment, wherein the lower edge 14 which is cylindrical around the axis of rotation 3 of the aerator 2 is adjustable in the vertical direction with respect to the remaining portion of the side wall 7 of the cap 5.

Figure 11:
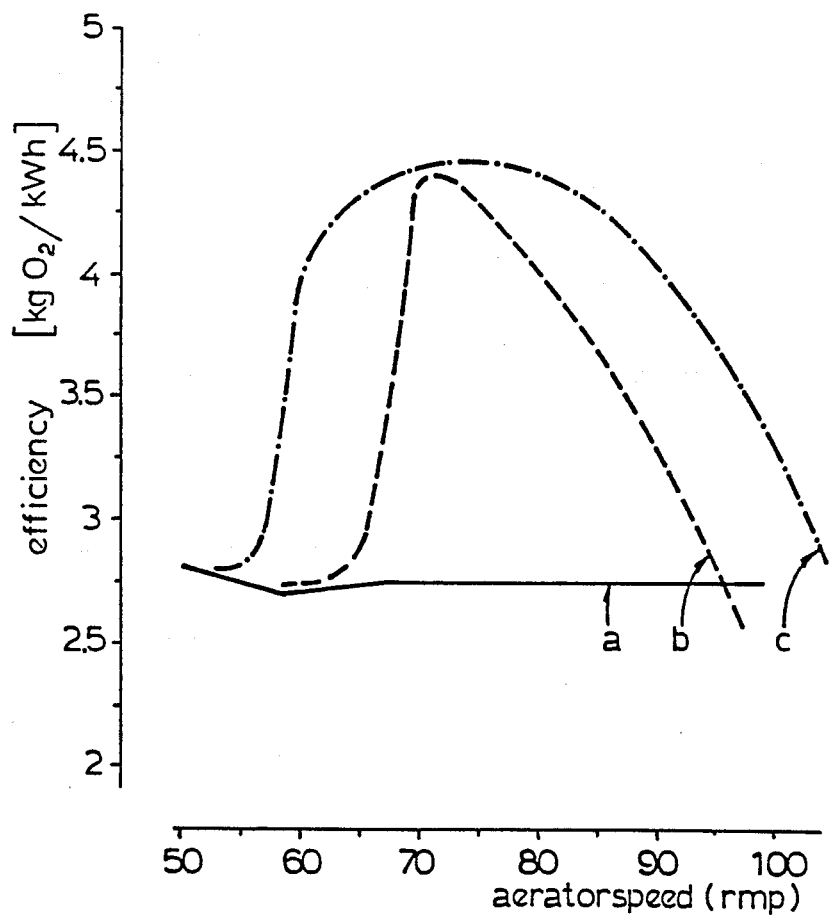
FIG. 11 is a diagram, in which the oxygen introduction efficiency is illustrated as function of the rotational speed of the aerator, wherein the influence of the aerator cap thereon is demonstrated.

FIG. 11 shows a diagram, which illustrates the oxygen introduction efficiency as a function of the rotational speed of the aerator 2, wherein the influence of the cap 5 thereon is demonstrated. Line a indicates the curve of the efficiency for an aerator without a cap, line b indicates this curve if the known cap according to British patent specification No. 1,547,115 is used, and line c indicates the curve of the efficiency in case the cap of FIG. 8 is provided for. In this diagram it can be seen, that in the latter case the maximum efficiency is almost not increased with respect to the situation in which the known cap is used, that, however, the range of rotational speeds of the aerator, in which an increased efficiency is obtained is enlarged substantially.

The FIG. 12-19 show installations for treating waste water by means of the activated sludge method, wherein the apparatus 1 for aerating waste water is used. Each installation comprises an open reservoir 15, in which a closed liquid circuit is formed with an supply (not shown), a discharge (not shown) and the apparatus 1 for aerating the waste water. Herein the aerator 2 of the apparatus 1 serves also as propulsion means for the liquid in the circuit.

In the neighbourhood of the aerator 2 an upright straight partition 16 is arranged, which constitutes the separation between the parts 17 and 18 of the circuit lying upstream and downstream of the aerator 2, respectively when viewed in the direction of flow. The spacing between the aerator zone 2 and the partition is so small, that the partition crosses the cap 5 of the aerator.

Figure 12:
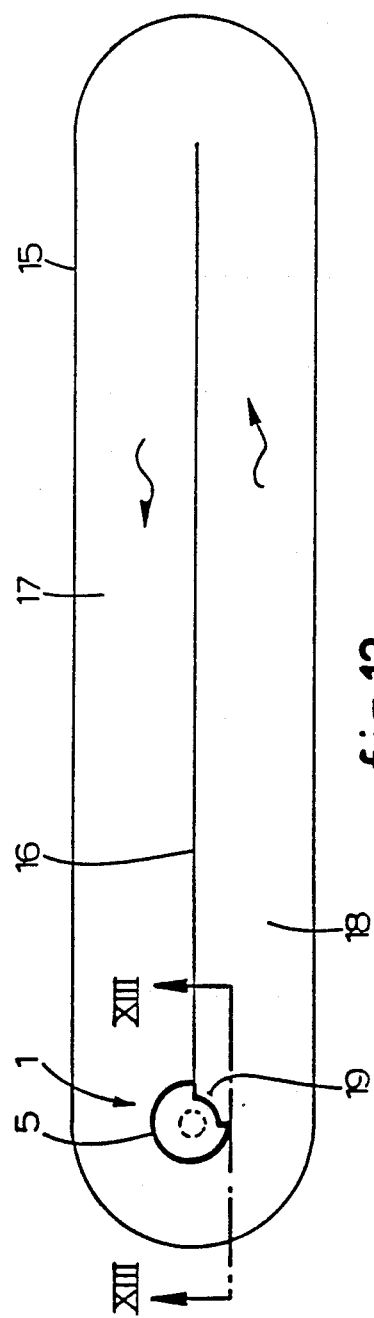
FIG. 12 is a plan view of an installation for treating waste water, in which a further embodiment of the apparatus for aerating waste water according to the invention is used.
Figure 13:
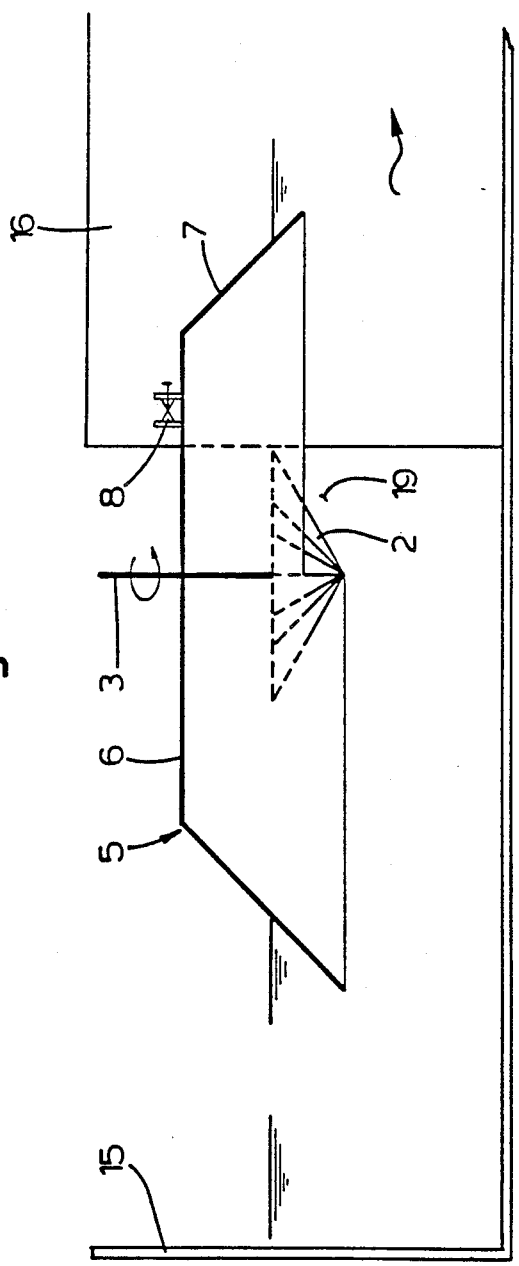
FIG. 13 is a section along the line XIII—XIII in FIG. 12, on an enlarged scale.

FIG. 12 and 13 illustrate an installation for treating waste water, wherein the cap 5 of the aerating apparatus 1 is modified in behalf of the propulsion of the liquid in the circuit. It can be seen that at the lower side of the cap 5 a recess 19 is formed. This recess extends from the side of the partition 16 facing the downstream part 18 of the liquid circuit through a part of the circumference of the side wall 7 of the cap 5, in the embodiment shown through a quarter of the circumference. The recess 19 extends from the lower side of the side wall 7 over a distance upwardly. This distance can be chosen such, that the upper side of the recess 19 still lies below the liquid surface, although it is also possible that the upper side of the recess 19 just makes contact with the water surface.

Figure 14:
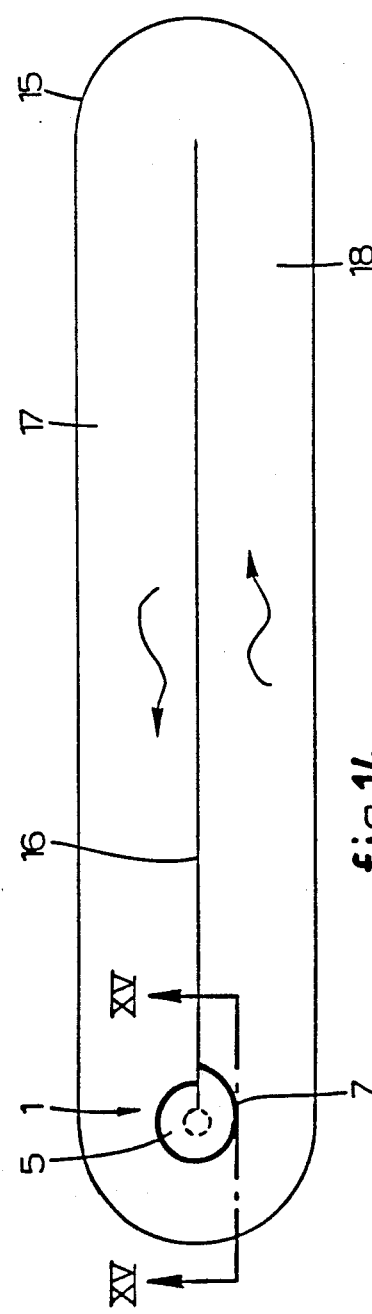
FIG. 14 is a plan view of an installation corresponding to FIG. 12, in which, however, an apparatus according to the invention with another aerator cap is used.
Figure 15:
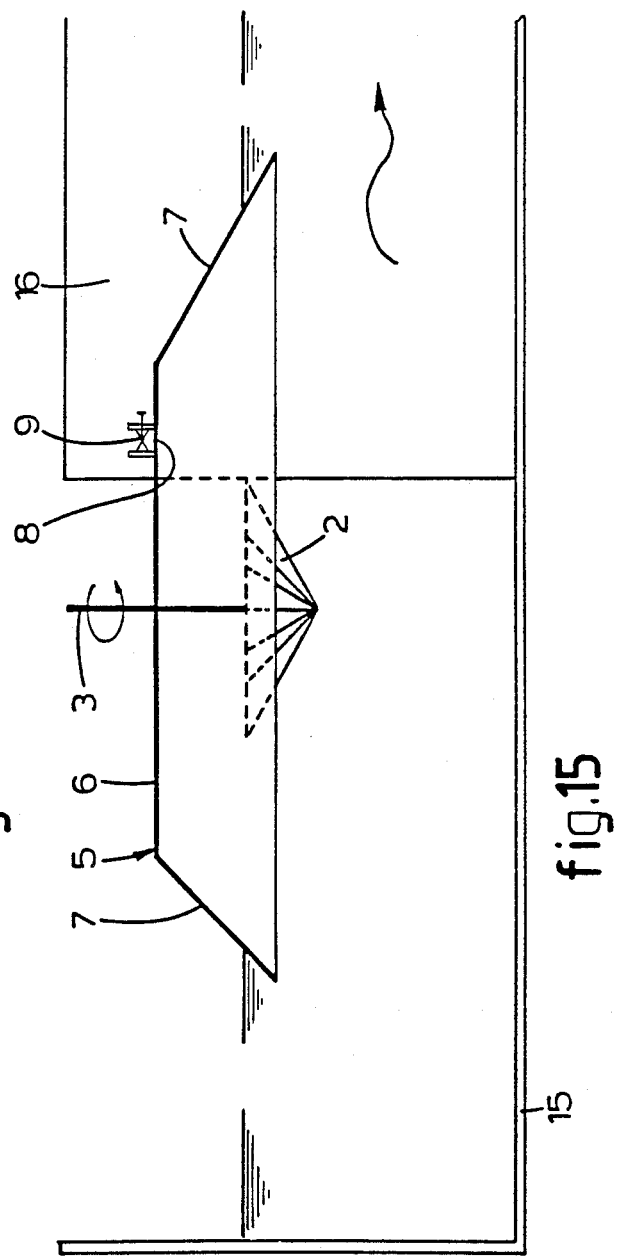
FIG. 15 is a section along the line XV—XV in FIG. 14, on an enlarged scale.

FIG. 14 and 15 show an alternative of the apparatus 1, wherein the portion of the side wall 7 of the cap 5 which is adjacent to the side of the partition 16 facing the downstream part 18 of the liquid circuit is placed at a smaller inclination to the horizontal than the remaining portion of the side wall 7.

In the embodiment illustrated the inclination of the side wall 7 decreases gradually in the direction facing away from the partition 16, so that in a horizontal section of the cap 5 the diameter of the cap 5 increases gradually from the point where the inclination of the cap 5 decreases and at this point both portions mentioned join smoothly.

Both features shown in FIG. 12, 13 and 14, 15 can of course be combined and be realised in one and the same cap 5.

The operation of the installations illustrated in Figs. 12-15 is as follows. Through a supply (not shown) waste water is introduced into the reservoir. As a result of the rotation of the aerator 2, the water in the reservoir 15 is circulated through the parts 17 and 18 of the circuit on both sides of the partition 16. During this circulation the aerator 2 brings air into the water, thereby activating the slude in the water to clean the supplied waste water. Thereupon the treated water is discharged from the reservoir 15.

FIG. 16 and 17 show still a further alternative of the cap 5 of the apparatus 1. Herein a recess 20 is formed at the lower side of the cap 5. This recess 20 extends from the side of the partition 16 facing the upstream part 17 of the liquid circuit through a part of the circumference of the side wall 7 of the cap 5. The recess 20 extends from the lower side of the side wall and terminates upwardly such that the upper side of the recess 20 is lying above the water surface.

In the embodiment of FIG. 18 and 19 the partition 16 also extends up tot he circumference of the aerator 2, but the height of the partition 16 under the cap 5 is such, that between the top wall 6 of the cap 5 and the upper side of the partition 16 a spacing is present. Preferably the partition 16 under the cap 5 extends upwardly to such an extent, that it projects a distance of at most about 0.1 times the diameter of the aerator 2 above the water surface.

The invention is not restricted to the embodiments shown in the drawing by way of example, which can be varied in several ways within the scope of the invention.

I claim:

1. An apparatus for contacting a gas with a liquid, in particular for aerating waste water in an installation for treating waste water, in which the waste water flows in a closed circuit and a partition is provided separating parts of the circuit lying upstream and downstream of an aeration zone, comprising
   a surface aerator adapted to rotate about a vertical axis of rotation and also serving for brining the liquid in the circuit into circulation, the surface aerator being arranged in the aeration zone in the neighbourhood of an end of the partition,
   a driving means coupled to the surface aerator,
   a rigid cap disposed over the aerator and comprising
      a top wall and an adjoining downwardly directed circumferential side wall, the side wall terminating below the liquid surface, and a portion of the side wall of the cap, which is adjacent to the side of the partition facing the downstream part of the circuit is provided with means which reduces a downward deflection of the horizontal liquid flow generated by the aerator.

2. An apparatus as claimed in claim 1, wherein the means for reducing a downward deflection of the horizontal liquid flow generated by the aerator is a recess in the lower side of the side wall of the cap, the recess extending from the partition through a part of the circumference and from the lower side of the side wall, over a distance upwardly, at most up to the liquid surface.

3. An apparatus as claimed in claim 2, wherein the recess extends through a quarter of the circumference of the side wall of the cap.

4. An apparatus as claimed in claim 1, wherein as means for reducing a downward deflection of the horizontal liquid flow generated by the aerator a portion of the side wall of the aerator cap which is adjacent to the side of the partition facing the downstream part of the circuit is placed at a smaller inclination to the horizontal than the remaining portion of the side wall of the cap.

5. An apparatus as claimed in claim 4, wherein the inclination of the side wall of the aerator cap increases gradually in the direction facing away from the partition.

6. An apparatus as claimed in claim 1, wherein in a portion of the side wall of the cap which is adjacent to the side of the partition facing the upstream part of the liquid circuit a recess is formed at the height of the liquid surface, the recess having an upper side lying above the liquid surface.

7. An installation for treating waste water according to the activated sludge method, comprising
   an open reservoir, in which a liquid circuit is formed,
   a surface aerator of the type which can also serve as propulsion means for circulating the liquid and which is adapted to rotate about a vertical axis, a rigid cap being disposed over the aerator, said cap comprising a top wall and an adjoining downwardly directed circumferential side wall, the side wall terminating below the liquid surface, an upright partition arranged in the reservoir and forming a separation between parts of the liquid circuit lying upstream and downstream of the aerator, the partition having an end terminating in the neighbourhood of the circumference of the aerator under the cap, the height of the partition under the cap being such that there is a spacing between the top wall of the cap and the partition.

8. An installation as claimed in claim 7, wherein the partition under the cap projects a distance of at most about 0.1 times the diameter of the aerator above the liquid surface.

* * * * *